(12) United States Patent
Chung

(10) Patent No.: US 7,823,140 B2
(45) Date of Patent: Oct. 26, 2010

(54) JAVA BYTECODE TRANSLATION METHOD AND JAVA INTERPRETER PERFORMING THE SAME

(75) Inventor: Seung-bum Chung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1434 days.

(21) Appl. No.: 11/231,977

(22) Filed: Sep. 22, 2005

(65) Prior Publication Data

US 2006/0070049 A1    Mar. 30, 2006

(30) Foreign Application Priority Data

Sep. 24, 2004    (KR) .................... 10-2004-0077199

(51) Int. Cl.
*G06F 9/45* (2006.01)
(52) U.S. Cl. .................... 717/148; 717/139; 717/153
(58) Field of Classification Search .................. 717/148
See application file for complete search history.

(56) References Cited

U.S. PATENT DOCUMENTS

| | | | | |
|---|---|---|---|---|
| 6,021,469 A | * | 2/2000 | Tremblay et al. | 711/125 |
| 6,256,784 B1 | | 7/2001 | Grove | |
| 6,523,168 B1 | | 2/2003 | Arnold et al. | |
| 2002/0066087 A1 | | 5/2002 | Long | |
| 2004/0221282 A1 | | 11/2004 | Le Metayer et al. | 717/159 |

FOREIGN PATENT DOCUMENTS

| | | |
|---|---|---|
| KR | 10-0329063 B1 | 3/2002 |
| KR | 2002-0051115 A | 6/2002 |
| KR | 2003-0000926 A | 1/2003 |

OTHER PUBLICATIONS

Practical Java Card bytecode compression Gabriel Bizzotto and Gilles Grimaud (14th French-speaking meetings of Parallelism) RENPAR'14 Hamamet, Tunisie Apr. 2002.*
Vmgen-a generator of efficient virtual machine interpreters M. Anton Ertl, David Gregg, Andreas Krall, and Bernd Paysan Software-Practice and Experience 2002 pp. 265-294.*
Identifying and evaluating a generic set of superinstructions for Java programs Diarmuid O'Donoghue and James F. Power International Conference on Embedded Systems and Applications pp. 192-198, Jun. 21-24, 2004.*
Towards Superinstructions for Java Interpreters Kevin Casey, David Gregg1, M. Anton Ertl, and Andrew Nisbet SCOPES 2003, LNCS 2826, pp. 329-343, 2003.*

(Continued)

*Primary Examiner*—Lewis A Bullock, Jr.
*Assistant Examiner*—Paul Mills
(74) *Attorney, Agent, or Firm*—Sughrue Mion, PLLC

(57) ABSTRACT

A Java bytecode translation method and a Java interpreter performing the Java bytecode translation method are provided. The Java bytecode translation method includes extracting a number of successive Java bytecodes from a Java class, determining whether the extracted successive Java bytecodes are successive field access bytecodes for accessing a field in the Java class and translating the extracted successive Java bytecodes into predefined bytecode if the extracted successive Java bytecodes are determined to be the successive field access bytecodes, and executing the predefined bytecode.

12 Claims, 12 Drawing Sheets

OTHER PUBLICATIONS

Supporting object accesses in a Java processor N. Vijaykrishnan and N.Ranganathan IEE Proc.-Comput. Digit. Tech, vol. 147, No. 6, Nov. 2000.*

Object-Oriented Architectural Support for a Java Processor N. Vijaykrishnan, N. Ranganathan, and R. Gadekarla ECOOP'98, LNCS 1445, pp. 330-355, 1998.*

Lars Ræder Clausen, Ulrik Pagh Schultz , Charles Consel , Gilles Muller Java Bytecode Compression For Embedded Systems 1998 ACM SIGPLAN '97 Conference on Programming Language Design and Implementation.

Mario Latendresse, Marc Feeley Generation of Fast Interpreters for Huffman Compressed Bytecode Proceedings of the 2003 workshop on Interpreters, virtual machines and emulators pp. 32-40, Year of Publication: 2003.

William Pugh Compressing Java Class Files ACM SIGPLAN Conference on Programming Language Design and Implementation May 24, 1999, pp. 247-258.

* cited by examiner

FIG. 3 (PRIOR ART)

| 0x3C | 0x03 | 0x67 | 0x00 | 0xB5 | 0x66 | 0x00 | 0xBD | 0x12 | 0x00 | 0xB4 | 0x2A |
|---|---|---|---|---|---|---|---|---|---|---|---|
| istore_1 | iconst_0 | 67 | 0 | putfield | 66 | 0 | anewarray | indexbyte2 | indexbyte1 | getfield | Aload_0 |

JAVA BYTECODE TRANSLATION METHOD AND JAVA INTERPRETER PERFORMING THE SAME

CROSS-REFERENCE TO RELATED APPLICATION

This application claims priority from Korean Patent Application No. 10-2004-0077199 filed on Sep. 24, 2004 in the Korean Intellectual Property Office, the disclosure of which is incorporated herein by reference in its entirety.

BACKGROUND OF THE INVENTION

1. Field of the Invention

The present invention relates to translation of Java bytecode, and more particularly, to a Java bytecode translation method in which Java bytecode is translated, thereby quickly accessing a field in a Java class, and a Java interpreter performing the Java bytecode translation method.

2. Description of the Related Art

Although the Java programming language has rapidly proliferated as a standard object-oriented programming language since its advent in the middle of the 1990s, it renders several disadvantages. Such a disadvantage includes a lower execution speed than the C programming language or the C++ programming language. In order to increase the execution speed of the Java programming language, a dynamic code generation system, such as a Java virtual machine adopting a just-in-time (JIT) compiler, and a static code generation system, such as a Java virtual machine adopting an ahead-of-time (AOT) compiler, have been developed.

A Java platform consists of a Java virtual machine and a plurality of classes. Each class consists of information regarding a data structure of the class, field information, and method information. Execution code of a method is written in bytecodes independent of a hardware device or an operating system.

Conventional Java virtual machines can be classified into interpreter-type Java virtual machines, JIT compiler-type Java virtual machines, interpreter-and-JIT compiler-type Java virtual machines, and AOT compiler-type Java virtual machines according to the types of their respective execution engines.

An interpreter-type Java virtual machine interprets a plurality of bytecodes of a method to be executed one by one, and executes an application program of the method.

A JIT compiler-type Java virtual machine compiles the bytecodes of the method to obtain machine codes dependent upon a Java platform, and executes the machine codes to execute the application program of the method.

FIG. 1 is a diagram illustrating a conventional Java virtual machine 100 and a Java class 160.

Referring to FIG. 1, the Java virtual machine 100 includes an interpreter 110 which sequentially executes a plurality of bytecodes, a JIT or AOT compiler 120, a class loader 130 which loads a java class to be executed therein, a runtime system 140 which combines the whole components, that is, the interpreter 110, the JIT or AOT compiler 120, and the class loader 130 and runs the components, and a garbage collector 150 which manages a Java object that has already been used.

The Java class 160 includes a plurality of application classes 170 which are defined and executed by a user, and a plurality of system classes 180 which are predefined to specify a variety of basic functions to be provided by the Java programming language.

FIG. 2 is a diagram illustrating the format of a conventional Java class file 200.

Referring to FIG. 2, the class file 200 includes basic information regarding the class file 200, a plurality of constants, an interface definition, field information, method information, and various attribute information.

A byte stream, which is also called bytecode, to be executed by an interpreter, is defined in the method information. Bytecode is obtained by compiling a file containing text messages written in a Java primitive language (e.g., a file with a file name extension 'java').

Bytecode is similar to a program module ready to be executed in that it is executed in a computer in units of bytes. However, bytecode instructions are actual instructions transmitted to a Java virtual machine that is a logical and abstract machine. Bytecode may be compiled by a JIT compiler so as to be compatible with a specific system platform, instead of being interpreted in units of bytes, in which case, the execution speed of a Java program is considerably increased.

One approach of increasing the execution speed of the Java program in an interpreter is to use a threaded interpreter technique in which the address of an opcode handler in an interpreter is written to a portion corresponding to an opcode in a bytecode format.

FIG. 3 is a diagram illustrating bytecode executed by a conventional Java virtual machine.

Referring to FIG. 3, a bytecode is defined as a byte stream in each method and is a type of intermediate code obtainable by compiling a file written in the Java programming language. Therefore, bytecode is similar to a ready-executable software program module in that one sentence is executed in a computer each time a compiling operation is made. Bytecode instructions are actually transmitted to a Java virtual machine which is a logical and abstract machine.

A single line of bytecode instructions contains a one-byte opcode for identifying an operation to be executed, and operands. An opcode may be followed by one or more operands. That is to say, the opcode and the operands are both stored in units of bytes, so that they may be represented by a number of successive bytes in order to express an operand having a size of one or more bytes. For example, a 16-bit operand may be represented by two successive bytes, and a 32-bit operand may be represented by four successive bytes.

The first row of Table illustrated in FIG. 3 shows hexadecimal values of bytecodes, and the second row of the table as illustrated in FIG. 3 indicates whether the bytecodes in the first row of the table are opcodes or operands.

FIG. 4 is a flowchart illustrating the loading and executing of a class by a conventional Java virtual machine.

Referring to FIG. 4, in operation S400, a class loader of a Java virtual machine loads an application class therein. In operation S410, the Java virtual machine performs a class linking operation. In operation S420, the Java virtual machine performs a class initialization operation. Thereafter, the Java virtual machine stores data obtained from the class linking operation and the class initialization operation in a data structure of a runtime system. In operation S430, an execution engine, such as an interpreter or a JIT compiler, executes a method.

FIG. 5 is a flowchart illustrating a bytecode execution method performed by a conventional Java interpreter.

Referring to FIG. 5, in operation S500, the Java interpreter calls a method. In operation S510, the Java interpreter increases a count value of a program counter designating one of a plurality of bytecodes of the method. In operation S520, the Java interpreter determines whether a bytecode (hereinafter referred to as the current bytecode) designated by a current count value of the program counter is the last bytecode of the method. In operation S530, if the current bytecode is determined not to be the last bytecode of the method in operation S520, the Java interpreter fetches a one-byte opcode. In operations S540 and S550, the Java interpreter moves to a handler corresponding to the opcode and executes the handler. Here, a handler is code defined by a Java interpreter to specify what action a Java virtual machine must take. Operations S510 through S550 are carried out as many times as there are bytecodes in the method, thereby completing an entire interpretation operation in operation S560.

The conventional bytecode execution method as illustrated in FIG. 5 may be represented in pseudo code as follows.

```
Loop {
    Op = *pc++;
    switch (Op) {
        case op_1:
            // op_1's implementation
            break;
        case op_2:
            // op_2's implementation
            break;
        case op_3:
            // op_3's implementation
            break;
        ...
    }
}
```

If an operand needed by an opcode in a handler consists of more than one byte, its value may be stored as a series of successive bytes. The successive bytes are reconstructed into a single meaningful value through bitwise OR and shift operations. For example, assuming that an opcode A in a CPU using little endian needs an operand having a 32-bit value, the operand may be represented by a series of four successive bytes, i.e., bytes 1 through 4. Therefore, first through eighth bits of the operand may be represented by byte 4, ninth through sixteenth bits of the operand may be represented by byte 3, seventeenth through twenty fourth bits of the operand may be represented by byte 2, and twenty fifth through thirty second bits of the operand may be represented by byte 1.

Therefore, the 32-bit value needed by the opcode A may be calculated through the following operation: (byte1<<24)| (byte2<<16)| (byte3<<8)| byte4. In a conventional Java virtual machine, this type of operand combination occurs whenever a method is executed.

In general, the reading/writing of field values from/to a Java class is frequently carried out when a method is executed. To perform this, bytecodes 'getfield' and 'putfield' are defined.

The bytecodes 'getfield' and 'putfield' are used to read/write the value of the bytecodes directly accompanied by an index in a predetermined field of a predetermined class. Usually, the bytecodes 'getfield' and 'putfield' are used for reading/writing a field value from/to a class currently being executed and are accompanied by bytecode 'aload_0'.

In other words, the bytecode 'getfield' following bytecode 'aload_0' is used for accessing a field in its class. The bytecode 'getfield' may be accompanied by bytecode 'aload_1', 'aload_2', or 'aload_3' instead of 'aload_0'. In this case, the bytecode 'getfield' can be used for obtaining a field value from a class other than its designated class.

In short, the bytecode 'getfield' may be used for obtaining different class objects by being accompanied by different types of bytecodes, but how the bytecode 'getfield' obtains a class object is always the same regardless of what bytecode it follows.

FIG. 6 is a flowchart illustrating a conventional bytecode execution method of accessing a field performed by a conventional Java interpreter.

Referring to FIG. 6, in operation S610, bytecode aload_n is executed and an n-th Java object in a local variable array (i.e., a Java class currently being executed if n=0) is stored in a stack.

In operation S620, the n-th Java object is extracted from bytecode getfield that follows the bytecode aload_n, and index information designating a field to be accessed is obtained from the n-th Java object. In operation S630, the address information of the field is calculated. In operation S640, a field value is obtained from the field address information and then is stored in the stack.

Despite so many advantages, including platform independence, the relatively slow execution speed of Java has made the Java platform problematic. In particular, an interpreter-type Java virtual machine ends up having a relatively low execution speed. Especially, the execution speed of a Java virtual machine is several times or dozens of times lower in an interpretation approach than in a platform-based native code generation approach in which native code is generated to be compatible with a Java platform.

Therefore, a variety of technologies, such as a JIT compilation technology, have been developed to enhance the execution speed of a Java virtual machine. However, in a conventional compilation method, compiled codes and intermediate codes always need to be stored in memories, and thus, a considerable amount of overhead may be generated in the middle of a compilation operation according to the degree to which a Java virtual machine is optimized. Therefore, platforms with a highly restricted memory capacity, such as embedded systems, still use the interpreter approach.

In addition, in a conventional real-time profiling-based selective compilation method, the so-called 'Hot Spot' algorithm, the interpreter-type approach is also used especially when a profiling operation is performed.

As described above, the interpreter-type approach is still adopted in various compilation methods in spite of its disadvantage, i.e., a slow execution speed. In light of the foregoing, there still exists a need for an improved execution speed.

SUMMARY OF THE INVENTION

The present invention provides a Java bytecode translation method which defines a new expansion bytecode in order to quickly access a class field that is frequently used in a Java application program and can enhance the performance of an entire Java class by improving the execution speed of a Java interpreter using the new expansion bytecode.

According to an aspect of the present invention, there is provided a Java bytecode translation method including extracting a number of successive Java bytecodes from a Java class, determining whether the extracted successive Java bytecodes are successive field access bytecodes for accessing a field in the Java class and translating the extracted successive Java bytecodes into a predefined bytecode if the extracted successive Java bytecodes are determined to be the successive field access bytecodes, and executing the predefined bytecode.

According to another aspect of the present invention, there is provided a bytecode processing module which extracts a number of successive Java bytecodes from a Java class, a bytecode translation module which determines whether the extracted successive Java bytecodes are successive field access bytecodes for accessing a field in the Java class and translates the extracted successive Java bytecodes into a predefined bytecode if the extracted successive Java bytecodes are determined to be the successive field access bytecodes, and a bytecode execution module which executes the predefined bytecode.

BRIEF DESCRIPTION OF THE DRAWINGS

The above and other aspects of the present invention will become more apparent by describing in detail exemplary embodiments thereof with reference to the attached drawings in which:

FIG. 3 is a diagram illustrating bytecode executed in a conventional virtual Java machine;

DETAILED DESCRIPTION OF EXEMPLARY EMBODIMENTS OF THE INVENTION

Figure 1:
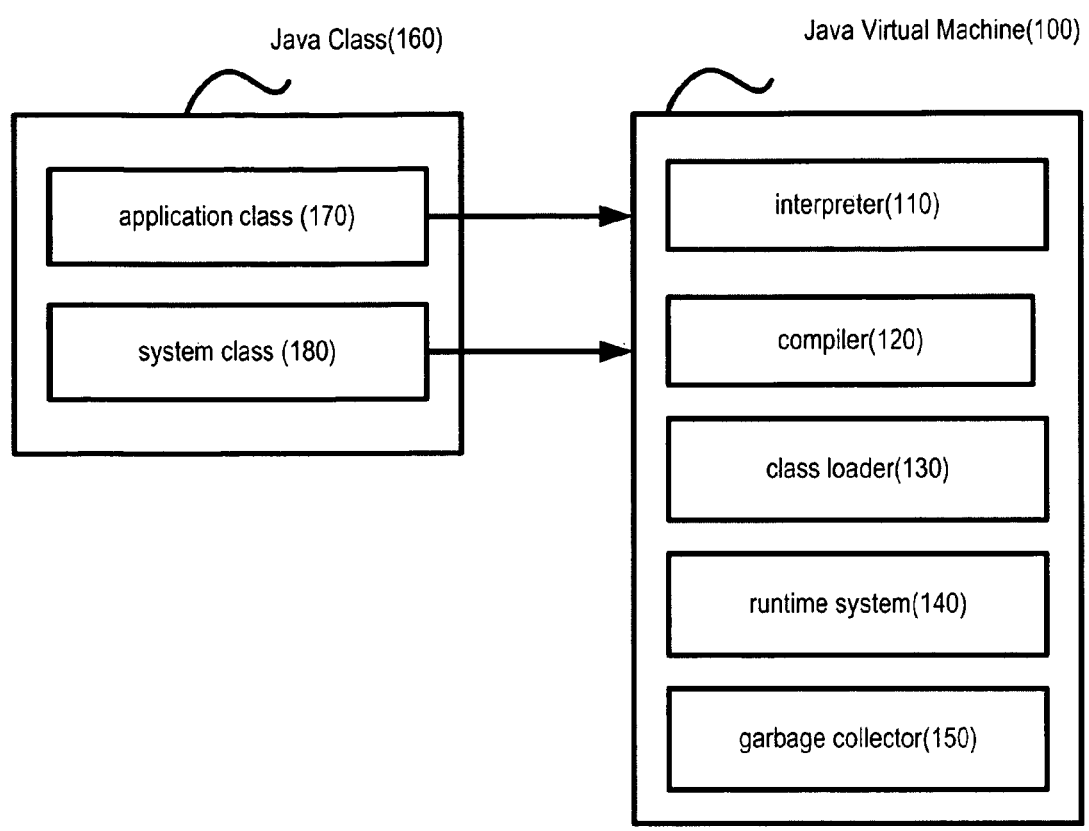
FIG. 1 is a block diagram of a conventional Java virtual machine and a conventional Java class.
Figure 2:
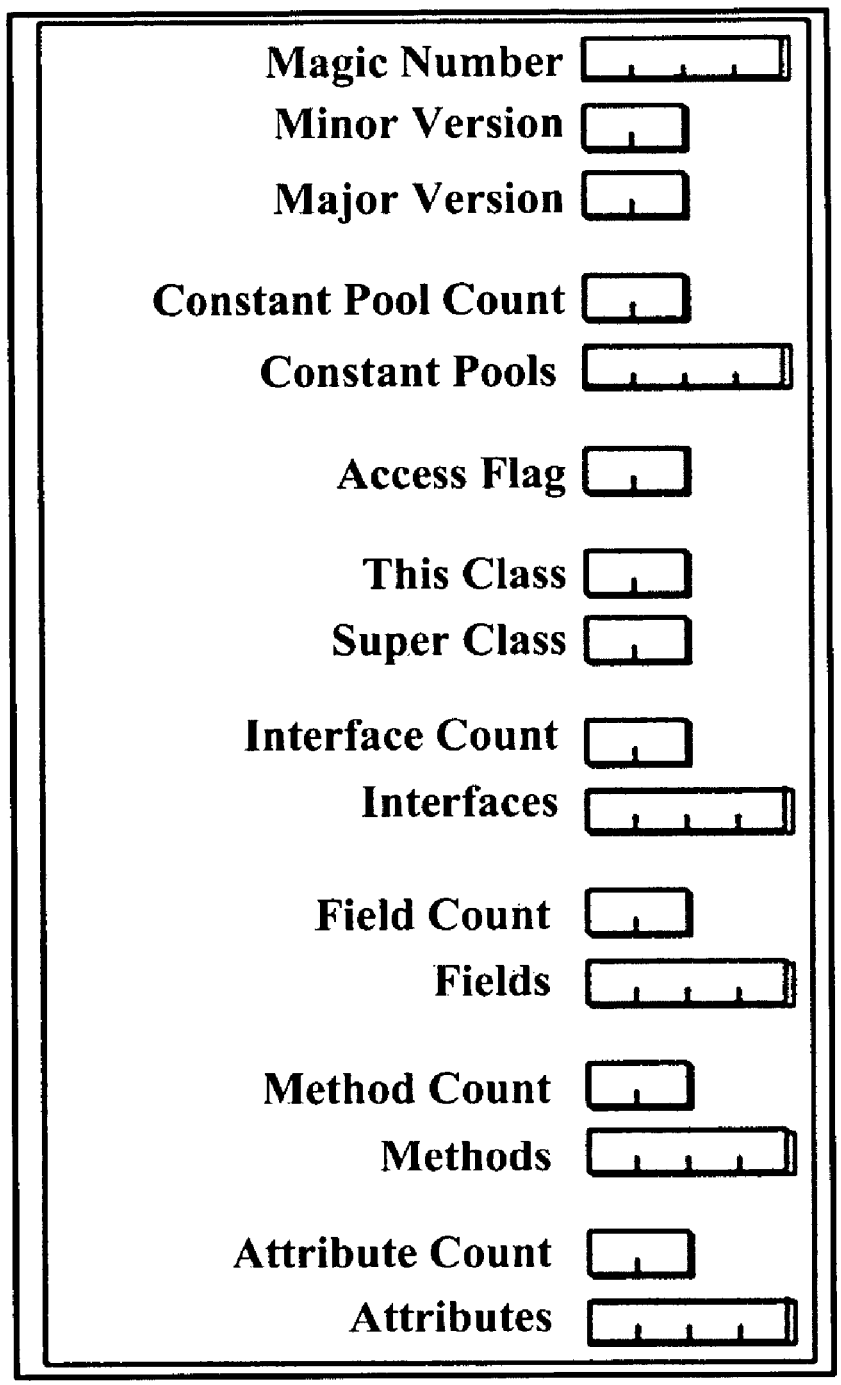
FIG. 2 is a diagram illustrating the format of a conventional Java class file.
Figure 4:
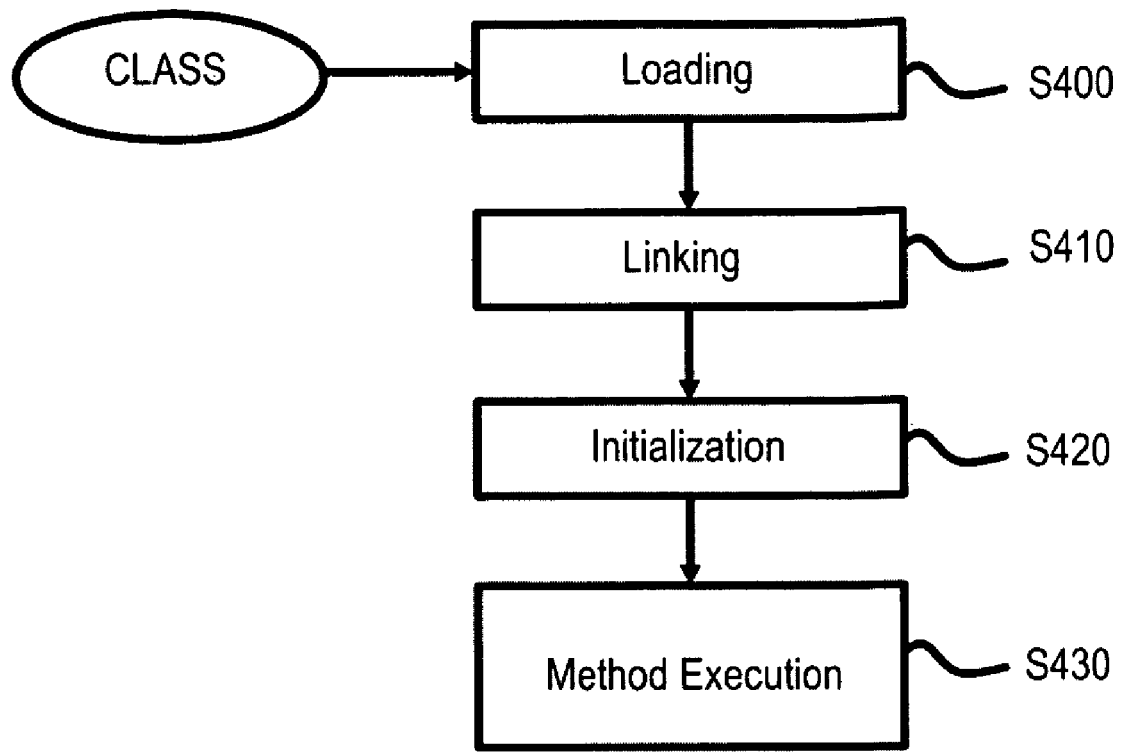
FIG. 4 is a flowchart illustrating the loading and executing of a class by a conventional Java virtual machine.
Figure 5:
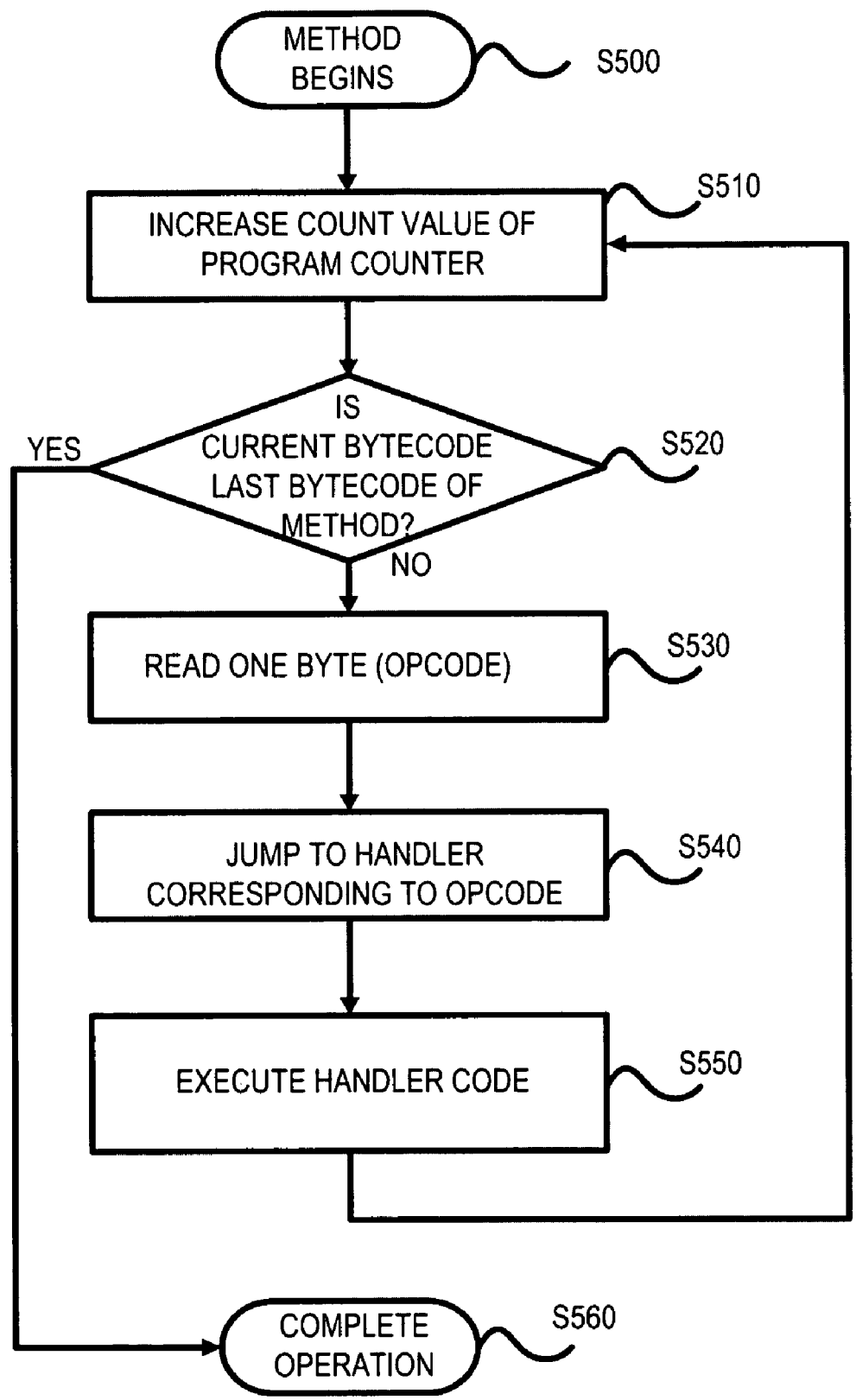
FIG. 5 is a flowchart illustrating the executing of an instruction code by a conventional Java virtual machine.
Figure 6:
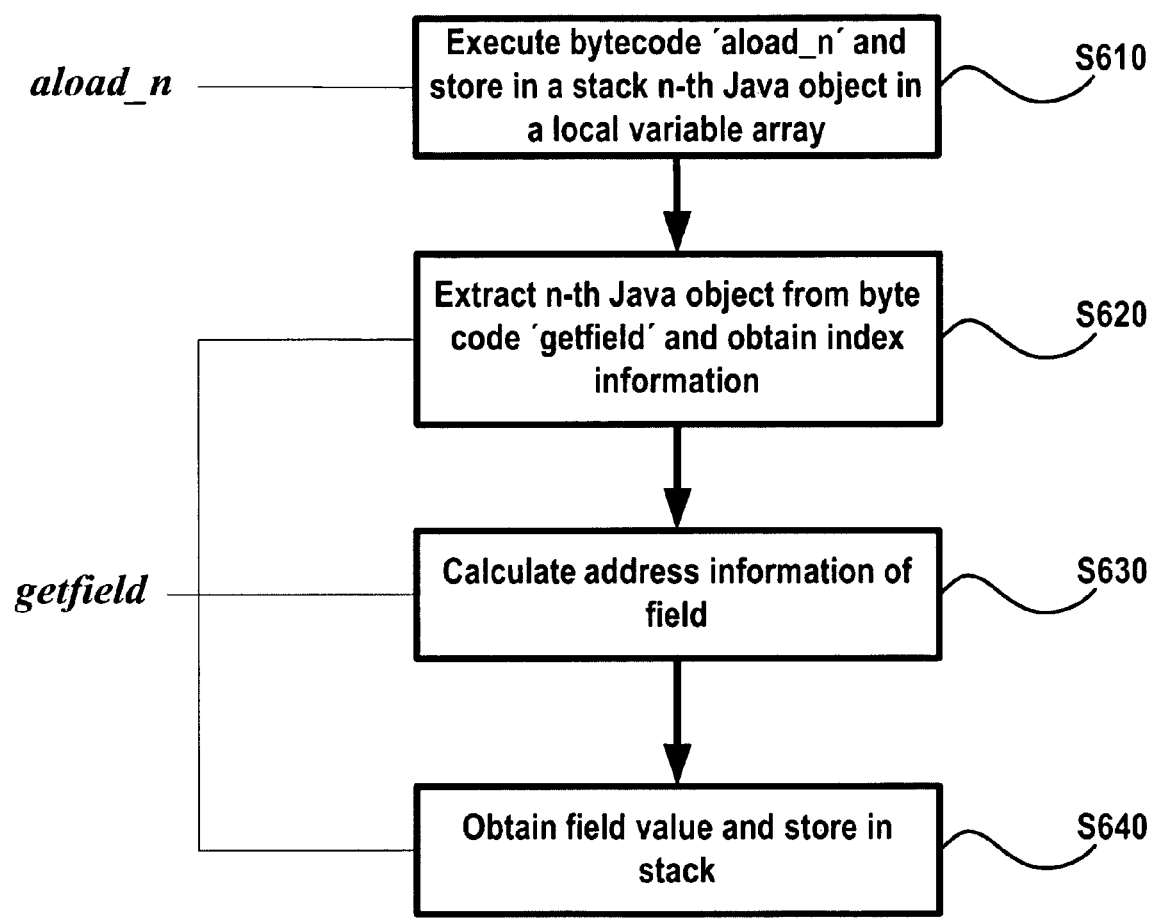
FIG. 6 is a flowchart illustrating the executing of bytecode by a conventional Java interpreter for accessing a field.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention is defined by the appended claims. Like reference numerals refer to like elements throughout the specification.

The present invention is described hereinafter with reference to flowchart illustrations of methods consistent with embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, a segment, or a portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 7:
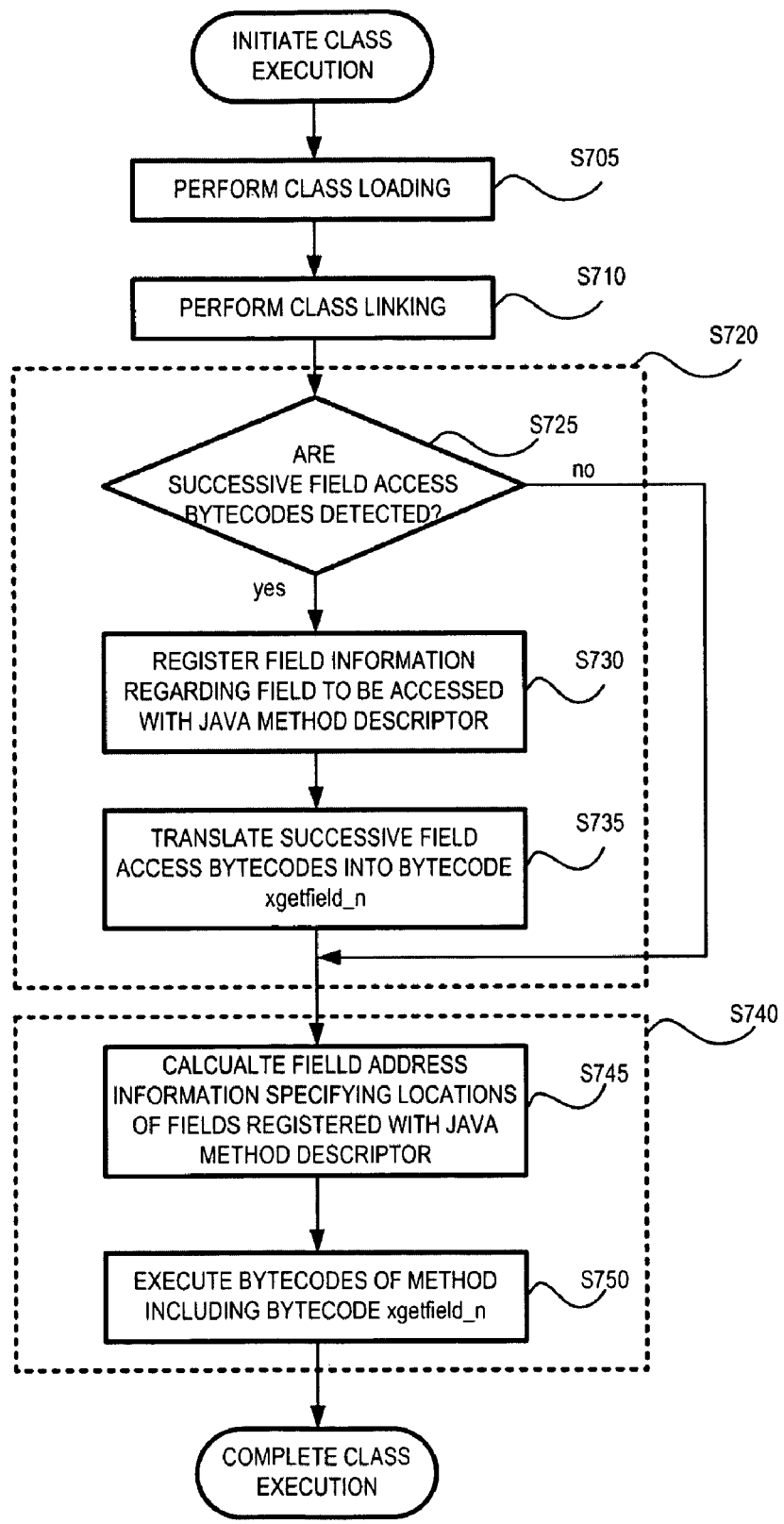
FIG. 7 is a flowchart illustrating a Java class execution method according to an exemplary embodiment of the present invention.

FIG. 7 is a flowchart illustrating a Java class execution method according to an exemplary embodiment of the present invention.

Referring to FIG. 7, in operation S705, a class loader loads a Java class therein. In operation S710, a linking operation is performed on the loaded Java class in the same manner as in the prior art. Thereafter, a bytecode translation operation (operation S720) for enabling a Java interpreter to access each of a plurality of fields in the loaded Java class and a bytecode execution operation (operation S740) are carried out. Operations S720 and S740 will now be described in further detail.

In operation S725, the Java interpreter sequentially examines bytecodes of a method included in the loaded Java class and determines whether a number of successive bytecodes detected from the method are successive field access bytecodes. The successive bytecodes may be 'aload_n' bytecodes and 'getfield' bytecodes.

The bytecode 'aload_n' stores an n-th object or class in a local variable array in a stack.

The bytecode 'getfield', which has a two-byte index value as an operand, fetches a field value corresponding to an index value of an object or class currently stored in the stack.

In operation S730, if the successive bytecodes are determined to be successive field access bytecodes in operation S725, information regarding a field to be accessed is registered with a Java method descriptor (JMD) in the loaded Java class. The information regarding the field to be accessed may be field address information which is referenced when accessing the field to be accessed.

In operation S735, the successive bytecodes are translated into bytecodes consistent with an exemplary embodiment of the present invention. For the convenience of explanation, it is assumed that the bytecode consistent with an exemplary embodiment of the present invention is bytecode 'xgetfield'. Since there is a possibility of one or more pairs of successive field access bytecodes being detected from a method, index information may be added to bytecodes 'xgetfield' which the pairs of successive field access bytecodes are respectively translated into so that the bytecodes 'xgetfield' can be differentiated from one another. For example, bytecode 'xgetfield' which a first pair of successive field access bytecodes detected from a method are translated into may be designated as 'xgetfield_0', bytecode 'xgetfield' which a second pair of successive field access bytecodes detected from the method are translated into may be designated as 'xgetfield_1'. In this manner, bytecode 'xgetfield' which an (n−1)-th pair of successive field access bytecodes detected from a method are translated into may be designated as 'xgetfield_n' (where n=0, 1, 2, ... ).

The field address information may be generated using index information 'n' of the bytecode 'aload_n' and operand information of the bytecode 'getfield'. The translation of a number of successive field access bytecodes into bytecode 'xgetfield' will now be described in further detail with reference to FIGS. 8 and 9.

Figure 8:
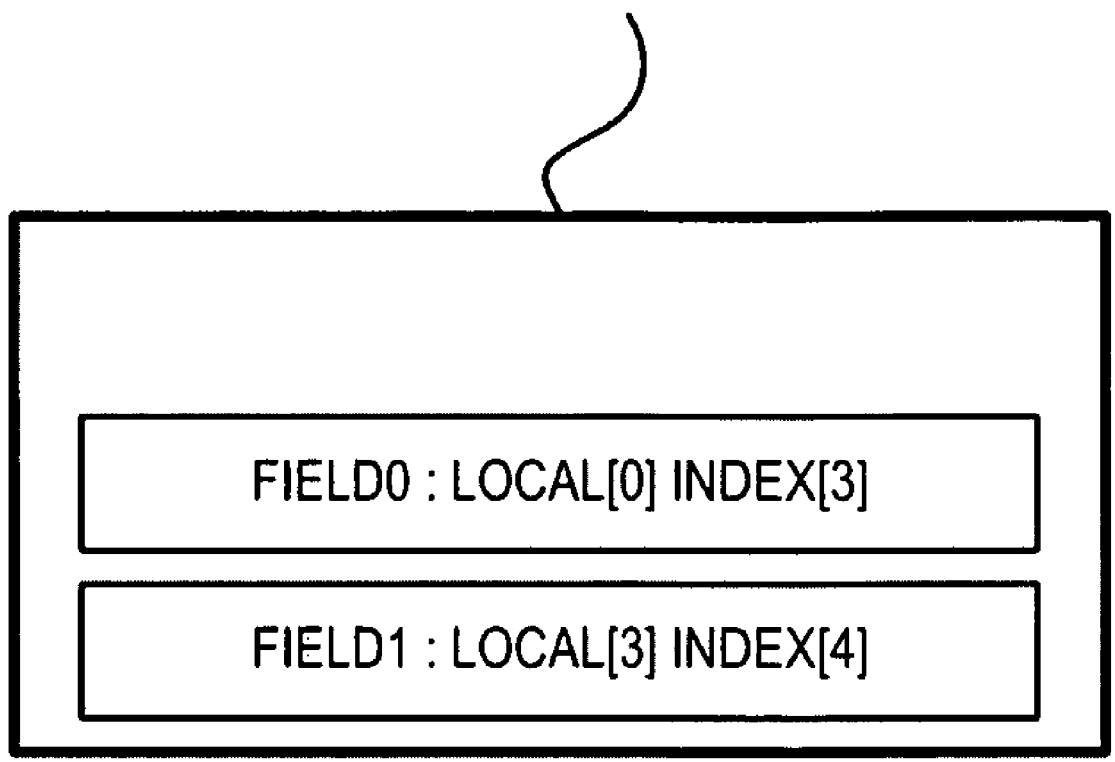
FIG. 8 is a block diagram illustrating the format of a Java method descriptor according to an exemplary embodiment of the present invention.

When a number of successive field access bytecodes are detected from a method by a Java interpreter, object index information designating an object of a local variable array and field index information are set in a zeroth field of a JMD 800 as illustrated in FIG. 8.

Figure 9:
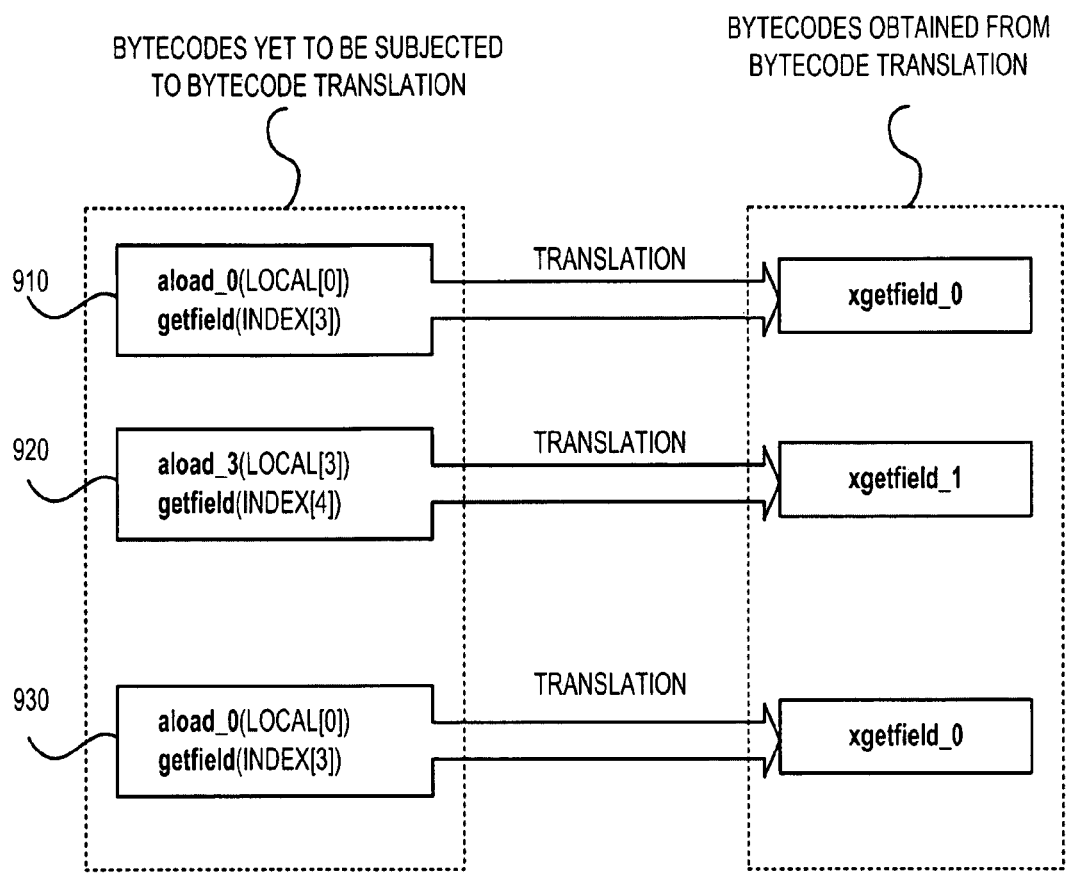
FIG. 9 is a block diagram explaining a Java bytecode translation method according to an exemplary embodiment of the present invention.

Referring to FIGS. 8 and 9, a first pair 910 of successive field access bytecodes detected from a method are bytecodes aload_0(local[0]) and getfield(index[3]). Thus, object index information designating a zeroth object of a local variable array and a field index value of 3 are set in the zeroth field of the JMD 800. The first pair 910 of successive field access bytecodes are translated into bytecode xgetfield_0.

Since a second pair 920 of successive field access bytecodes detected from the method are bytecode aload_3(local[3]) and getfield(index[4]), index information regarding a third object of the local variable array and a field index value of 4 are set in a first field of the JMD 800. The second pair 920 of successive field access bytecodes is translated into bytecode xgetfield_1.

Since a third pair 930 of successive field access bytecodes detected from the method are bytecodes aload_0(local[0]) and getfield(index[3]) and are thus identical to the first pair 910 of successive field access bytecodes, there is no need to set object index information and a field index value in the JMD 800 for the third pair of successive field access bytecodes. The third pair 930 of successive field access bytecodes is translated into the bytecode xgetfield_0.

If three successive field access bytecodes, for example, aload_n, dup, and getfield, are detected from a method, they may be translated into predefined bytecodes in the above-mentioned approach by treating the bytecodes dup and getfield as a single bytecode getfield.

A maximum number of bytecodes xgetfield_n into which a plurality of groups of successive field access bytecodes are translated is restricted to the number of bytecodes that have not yet been used by a Java virtual machine among an array of a maximum of 256 bytecodes.

Bytecode xgetfield_n may be interpreted differently by different methods. For example, a method may interpret bytecode xgetfield_0 as being required to access a field indicated by an index value of 4 included in a zeroth class of a local variable array while another method may interpret the bytecode xgetfield_0 as being required to access a field indicated by an index value of 7 included in a third class of the local variable array. Therefore, field information regarding a field that needs to be accessed by bytecode xgetfield_n must be defined as array information for each method, and the array information must be stored in the JMD 800.

A class linking operation, i.e., operation S710 as illustrated in FIG. 7, may be performed before the execution of a bytecode operation or in the middle of the execution of a bytecode operation. Performing a class linking operation before the execution of bytecode is called early binding, and performing a class linking operation during the execution of bytecode is called late binding. FIG. 7 illustrates early binding. However, the present invention is not restricted to early binding but applicable to a case in which a class linking operation and a bytecode translation operation are performed even during the process of executing bytecode.

Referring to FIG. 7, in operation S740, the bytecodes included in the method and the bytecode xgetfield, which the successive bytecodes are translated into, are executed. In detail, in operation S745, an address of a field registered with the JMD 800 is calculated. In operation S750, the bytecodes included in the method and the bytecode xgetfield, which the successive bytecodes are translated into, are executed. The execution of bytecode will now be described in further detail with reference to FIGS. 10A and 10B.

Figure 10A:
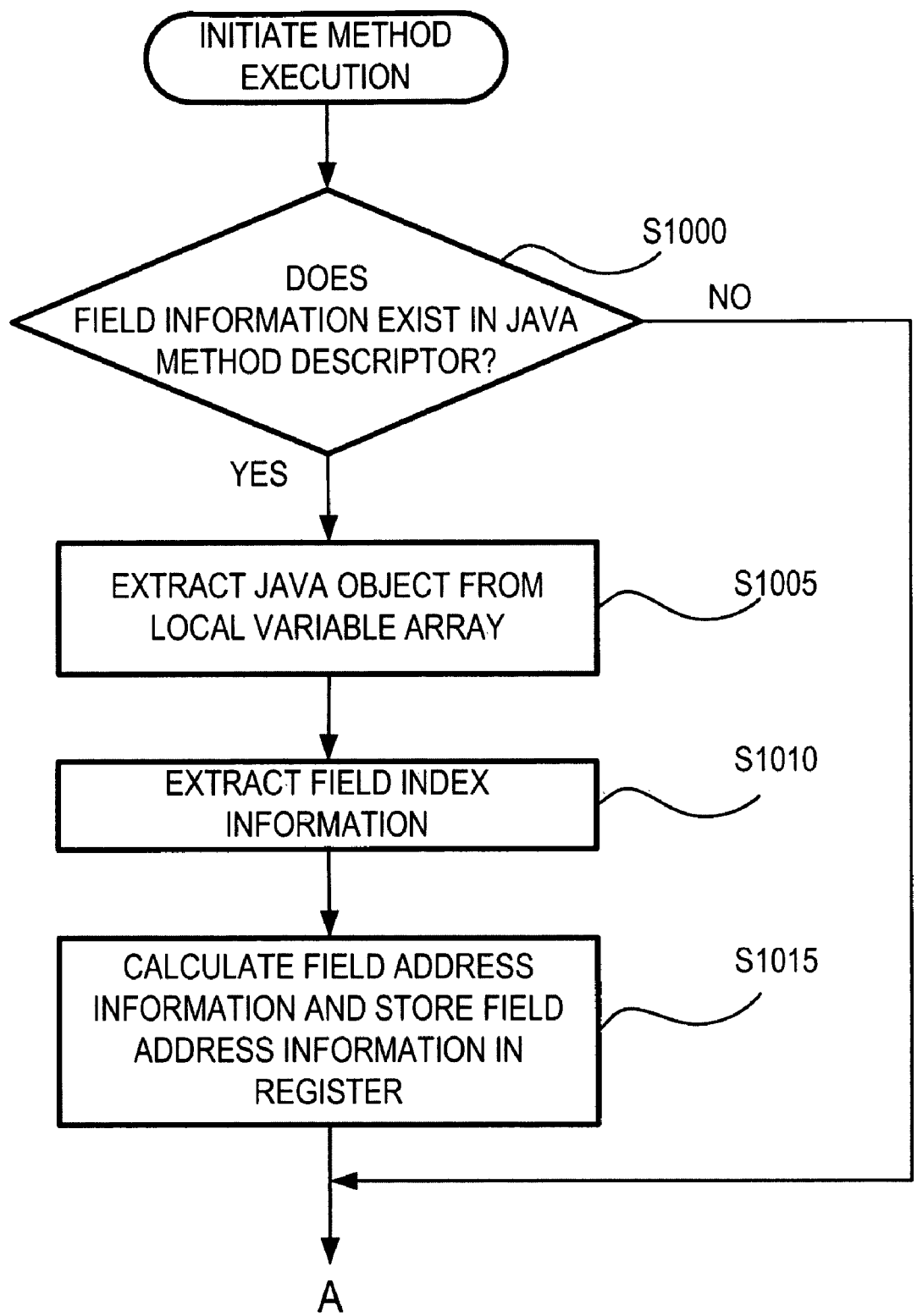
FIGS. 10A and 10B are flowcharts illustrating the Java bytecode translation method according to an exemplary embodiment of the present invention.
Figure 10B:
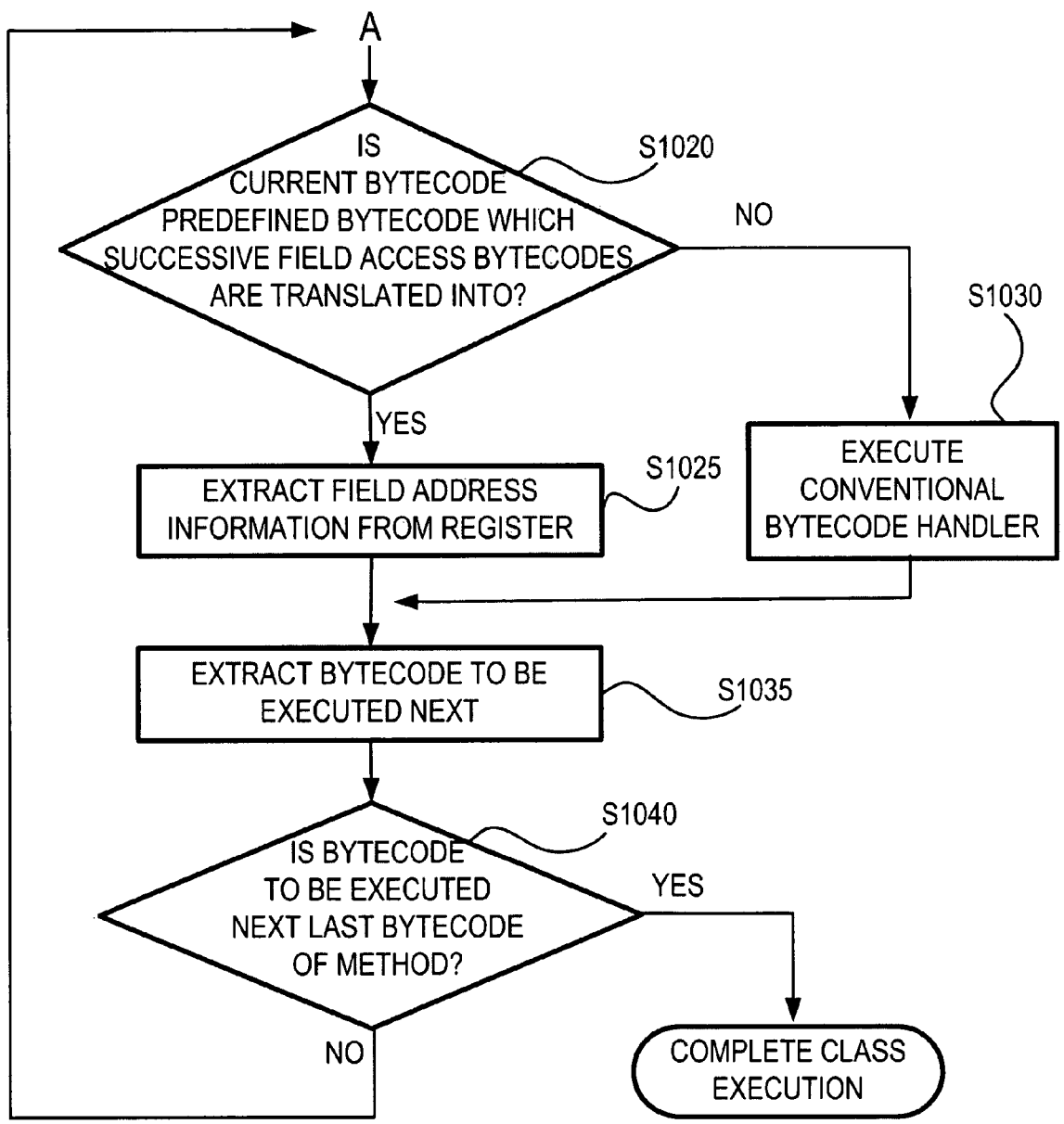

FIGS. 10A and 10B are flowcharts illustrating a bytecode execution method according to an exemplary embodiment of the present invention. Referring to FIG. 10A, in operation S1000, it is determined whether information regarding a plurality of fields that have been registered with a JMD in a bytecode translation operation exists in a JMD.

In operations S1005 and S1010, if field index information, such as the field index information as illustrated in FIG. 8, exists in the JMD, a Java object and a field index value are extracted from a local variable array with reference to the field index information. Here, the Java object is a Java class.

In operation S1015, field address information is calculated using the extracted Java object and the extracted field index information, and then the calculated field address information is stored in a temporary storage device, such as a register.

If the field index information does not exist in the JMD, operations S1005, S1010, and S1015 may be skipped.

Referring to FIG. 10B, in operation S1020, before executing bytecode of a predetermined method, a Java interpreter determines whether the bytecode has been obtained from a bytecode translation operation. In operation S1025, if the bytecode is determined in operation S1020 to have been obtained from a bytecode translation operation, the Java interpreter extracts field address information from the register and fetches a field value from a location specified by the extracted field address information.

In operation S1030, if the bytecode is determined in operation S1020 not to have been obtained from a byte translation operation, a conventional bytecode handler is executed.

In operation S1035, the Java interpreter extracts bytecode to be executed next from the predetermined method. In operation S1040, the Java interpreter determines whether the bytecode extracted in operation S1035 is the last bytecode of the predetermined method.

If the bytecode extracted in operation S1035 is the last bytecode of the predetermined method, an entire class execution operation is complete. Otherwise, the method returns to operation S1020. In this case, field address information does not need to be calculated. In other words, if the bytecode extracted in operation S1035 is determined to have been obtained from a bytecode translation operation, field address information for the bytecode extracted in operation S1035 is simply fetched from the register, and then the bytecode extracted in operation S1035 is executed using the field address information fetched from the register.

In the present exemplary embodiment, bytecode which a number of successive field access bytecodes are translated into is executed by referencing a field value stored in a register without the need to calculate field address information.

When an address of a class field changes due to the occurrence of a garbage collection in the middle of executing a method, a field value stored in the register does not match the address of the class field any longer. In this case, in the present embodiment, the address of the class field is updated by performing operations S1000 through S1015 as illustrated in FIG. 10A.

Figure 11:
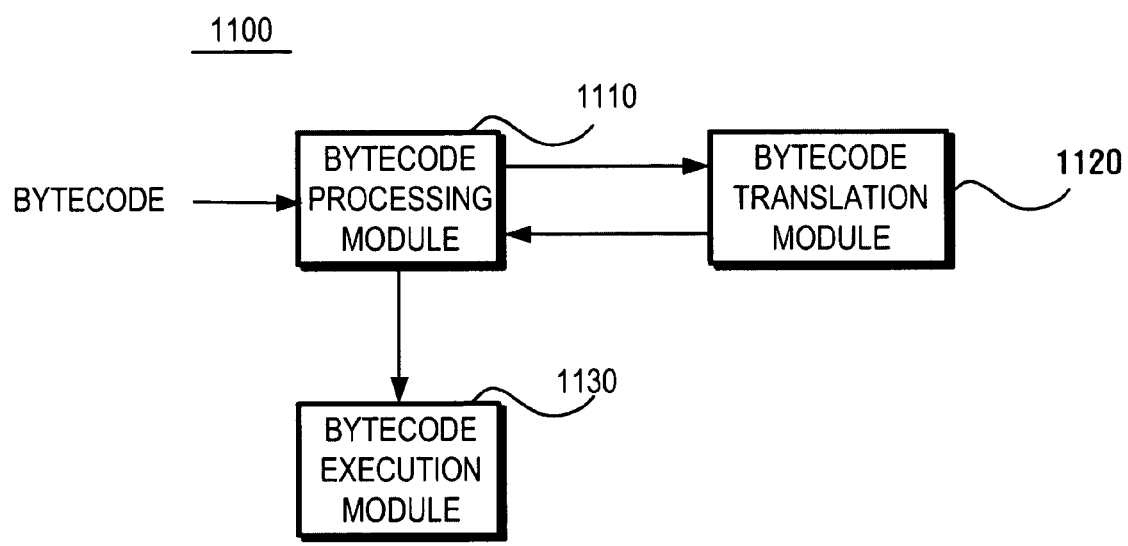
FIG. 11 is a block diagram of a Java interpreter according to an exemplary embodiment of the present invention.

FIG. 11 is a block diagram of a Java interpreter 1100 according to an exemplary embodiment of the present invention. Referring to FIG. 11, the Java interpreter 1100 includes a bytecode processing module 1110, a bytecode translation module 1120, and a bytecode execution module 1130.

The bytecode processing module 1110 extracts a number of successive Java bytecodes from a Java class.

The bytecode translation module 1120 determines whether the successive Java bytecodes are successive field access bytecodes for accessing a field in the Java class and translates the successive Java bytecodes into predefined bytecode if the successive Java bytecodes are determined to be successive field access bytecodes. In addition, the bytecode translation module 1120 sets object index information regarding a local variable array and field index information in a JMD included in the Java class.

The bytecode execution module 1130 executes the predefined bytecode.

The term 'module', as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they are executed one or more CPUs in a communication system.

The operations occurring among various modules will now be described.

First, the bytecode processing module 1110, the bytecode translation module 1120, and the bytecode execution module 1130 will now be described in further detail.

The bytecode processing module 1110 sequentially examines a plurality of bytecodes of a method included in a Java class and determines whether a number of successive bytecodes detected from the method are successive field access bytecodes.

If the detected successive bytecodes are determined to be successive field access bytecodes, the bytecode translation module 1120 registers field index information regarding a field to be accessed with a JMD included in the Java class and translates the detected successive bytecodes into predefined bytecode according to an exemplary embodiment of the present invention, for example, bytecode xgetfield_n.

When the Java interpreter begins to execute each of the bytecodes of the method, the bytecode processing module 1110 calculates field address information specifying a location in which a field value is stored by using the field index information registered with the JMD and stores the calculated field address information in a temporary storage device, such as a register.

Thereafter, the bytecode execution module 1130 executes each of the bytecodes examined by the bytecode processing unit 1110. When the bytecode execution module 1130 encounters bytecode which a number of successive field access bytecodes are translated into, it simply fetches the field address information from the register and obtains a field value from the field address information.

In order to determine the effectiveness of the present invention, there is a need to examine the quantity of field access bytecodes possessed by a typical Java application program. A typical benchmark suite, i.e., SPECjvm98, was used to measure the performance of a Java virtual machine.

The percentage of bytecodes of a Java class that are field access bytecodes was measured using each of a plurality of benchmark programs (i.e., compress, jess, db, javac, mpegaudio, mtrt, and jack) of the benchmark suite SPECjvm98, and the results are shown in Table 1 below.

TABLE 1

| Compress | 24.80% |
|----------|--------|
| Jess | 25.20% |
| Db | 21.40% |
| Javac | 20.20% |
| Mpegaudio | 11.20% |
| Mtrt | 27.10% |
| Jack | 11.40% |

As indicated in Table 1, field access bytecodes account for a large portion (about 20%) of an entire Java class.

In exemplary embodiments of the present invention, field address information is calculated in advance in units of methods and then is stored in a temporary storage device, such as a register. In this regard, a reduced instruction set computing (RISC) central processing unit (CPU) including a considerable number of registers may be used to enhance the execution speed of a Java interpreter by using the present invention.

The number of CPU instructions used in the bytecode execution method consistent with an exemplary embodiment of the present invention was compared with the number of CPU instructions used in a conventional bytecode execution method by using a Microprocessor without Interlocked Pipeline Stages (MIPS) core CPU which is widely used in an embedded system environment. The comparison results are as follows.

1. The Conventional Bytecode Execution Method (1) Nine CPU instructions were used for obtaining a Java object from a local variable array, storing the Java object in a stack, and moving to bytecode aload_0.

(2) Six CPU instructions were used for extracting index information from bytecode getfield and calculating field address information.

(3) Nine CPU instructions were used for obtaining a field value from the field address information, storing the field value in the stack, and moving to the bytecode getfield.

In short, a total of 24 CPU instructions were used in the conventional bytecode execution method.

2. The Bytecode Execution Method Consistent with an Embodiment of the Present Invention (1) Twelve CPU instructions were used for obtaining a Java object from a local variable array, calculating field address information, and storing the field address information in a register.

(2) Nine CPU instructions were used for obtaining a field value from the field address information, storing the field value in a stack, and moving to bytecode xgetfield_n.

Here, a total of 21 CPU instructions were used in the bytecode execution method consistent with an embodiment of the present invention.

In the prior art, 24 CPU instructions are required to execute bytecode. On the other hand, in the present invention, field address information is calculated once for each method. Accordingly, there is no need to calculate field address information in the middle of executing a plurality of bytecodes of each method, and thus, only nine CPU instructions are required to execute bytecode.

In other words, assuming that a field in a method is accessed n times, (9×n)+12 instructions need to be executed in the present invention, while (24×n) instructions need to be executed in the prior art.

Therefore, the present invention is suitable for handling a method with fields frequently accessed.

Given that a 'for' or 'while' loop is frequently used in a Java method and field access is frequently carried out within repetitions of the 'for' or 'while' loop, it is possible to enhance the execution speed of a Java interpreter by using the Java bytecode translation method according to an exemplary embodiment of the present invention.

In the present invention, a number of successive field access bytecodes that are frequently executed are translated into a single bytecode. Thus, it is possible to reduce the amount of stack computation and to skip a subsequent bytecode preparation operation, which is an essential part of the operation of a conventional Java interpreter.

In addition, in the present invention, it is possible to improve the execution speed of a Java interpreter by optimizing field access bytecodes using the Java bytecode translation method and the Java interpreter performing the method.

Moreover, in the present invention, it is possible to exhibit improved performance of an embedded system with limited system resources by employing the Java platform consistent with the present invention.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A Java bytecode translation method comprising:
    performing a linking operation on a Java class;
    extracting a number of successive Java bytecodes from the linked Java class;
    determining whether the extracted successive Java bytecodes are successive field access bytecodes for accessing a field in the Java class;
    translating the extracted successive Java bytecodes into a predefined bytecode if the extracted successive Java bytecodes are determined to be the successive field access bytecodes, wherein translating comprises generating object index information designating an object of a local variable array and field index information designating a field to be accessed when referencing a field value; and
    executing a method of the Java class containing the predefined bytecode, wherein executing the method comprises:
        extracting the object from the local variable array designated by the object index information;
        calculating an address of the field to be accessed designated by the field index information using the extracted object;
        storing the address of the field in a temporary storage device; and
        executing the predefined bytecode using the address of the field stored in the temporary storage device to fetch the field value.

2. The Java bytecode translation method of claim 1, wherein the object index information and the field index information are set in a Java method descriptor for the method of the Java class.

3. The Java bytecode translation method of claim 1, wherein the temporary storage device comprises a register.

4. The Java bytecode translation method of claim 1, wherein the successive field access bytecodes comprise bytecodes 'aload_n', where n is an integer greater than or equal to 0, and 'getfield'.

5. The Java bytecode translation method of claim 1, wherein the successive field access bytecodes comprise bytecodes 'aload_n', where n is an integer greater than or equal to 0, 'dup', and 'getfield'.

6. The Java bytecode translation method of claim 1, wherein the predefined bytecode is one byte long.

7. A Java interpreter stored on a non-transitory computer readable storage medium, the Java interpreter comprising:
    a linking module, which performs a linking operation on a Java class;
    a bytecode processing module which extracts a number of successive Java bytecodes from the linked Java class;
    a bytecode translation module which determines whether the extracted successive Java bytecodes are successive field access bytecodes for accessing a field in the Java class and translates the extracted successive Java bytecodes into predefined bytecode if the extracted successive Java bytecodes are determined to be the successive field access bytecodes, wherein the translating comprises generating object index information designating an object of a local variable array and field index information designating a field to be accessed when referencing a field value; and
    a bytecode execution module which executes a method of the Java class containing the predefined bytecode, wherein the executing comprises:
        extracting the object from the local variable array designated by the object index information;
        calculating an address of the field to be accessed designated by the field index information using the extracted object;
        storing the address of the field in a temporary storage device; and
        executing the predefined bytecode using the address of the field stored in the temporary storage device to obtain the field value.

8. The Java interpreter of claim 7, wherein the object index information and the field index information are set in a Java method descriptor for the method of the Java class.

9. The Java interpreter of claim 7, wherein the temporary storage device comprises a register.

10. The Java interpreter of claim 7, wherein the successive field access bytecodes comprise 'aload_n' bytecodes, where n is an integer greater than or equal to 0, and 'getfield' bytecodes.

11. The Java interpreter of claim 7, wherein the successive field access bytecodes comprise 'aload_n' bytecodes, where n is an integer greater than or equal to 0, 'dup' bytecodes and 'getfield' bytecodes.

12. The Java interpreter of claim 7, wherein the predefined bytecode is one byte long.

* * * * *